United States Patent
Takayama et al.

(10) Patent No.: US 11,466,405 B2
(45) Date of Patent: *Oct. 11, 2022

(54) CARBOXYMETHYLATED MICROFIBRILLATED CELLULOSE FIBERS AND COMPOSITION THEREOF

(71) Applicant: NIPPON PAPER INDUSTRIES CO., LTD., Tokyo (JP)

(72) Inventors: Masato Takayama, Tokyo (JP); Yoshihiro Aoki, Tokyo (JP); Takanori Otsuhata, Tokyo (JP); Takeo Izumiya, Tokyo (JP); Hiroyuki Okumura, Tokyo (JP); Tomonori Kawamata, Tokyo (JP); Ryo Sotooka, Tokyo (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 64 days.

This patent is subject to a terminal disclaimer.

(21) Appl. No.: 17/042,310

(22) PCT Filed: Mar. 28, 2019

(86) PCT No.: PCT/JP2019/013641
§ 371 (c)(1),
(2) Date: Dec. 9, 2020

(87) PCT Pub. No.: WO2019/189595
PCT Pub. Date: Oct. 3, 2019

(65) Prior Publication Data
US 2021/0238313 A1    Aug. 5, 2021

(30) Foreign Application Priority Data
Mar. 30, 2018 (JP) .............................. JP2018-070268

(51) Int. Cl.
| | | |
|---|---|---|
| *D21H 11/20* | (2006.01) | |
| *D21H 15/02* | (2006.01) | |
| *C08B 11/12* | (2006.01) | |
| *D21H 17/67* | (2006.01) | |

(52) U.S. Cl.
CPC .............. *D21H 11/20* (2013.01); *C08B 11/12* (2013.01); *D21H 15/02* (2013.01); *D21H 17/67* (2013.01); *D10B 2201/00* (2013.01); *D10B 2401/16* (2013.01)

(58) Field of Classification Search
CPC ........ D21H 17/67; D21H 17/25; D21H 11/20; D21H 11/18; D21H 15/02; C08B 15/02; C08B 11/12; C08B 15/04; D10B 2401/16; D10B 2201/00
USPC ................................................. 536/98; 162/9
See application file for complete search history.

(56) References Cited

U.S. PATENT DOCUMENTS

| | | | |
|---|---|---|---|
| 2016/0289894 A1 | 10/2016 | Kajanto et al. | |
| 2021/0115160 A1* | 4/2021 | Takayama | ............... D21H 11/20 |
| 2021/0131036 A1* | 5/2021 | Takayama | ............... D21H 11/18 |
| 2021/0131037 A1* | 5/2021 | Takayama | ............... D21C 9/002 |

FOREIGN PATENT DOCUMENTS

| | | |
|---|---|---|
| CA | 2999970 A1 | 4/2017 |
| EP | 3127868 A1 | 2/2017 |
| JP | 10-251301 A | 9/1998 |
| JP | 2002-194691 A | 7/2002 |
| JP | 2002-536507 A | 10/2002 |
| JP | 2013-531749 A | 8/2013 |
| JP | 2016-223042 A | 12/2016 |
| JP | 2017-110085 A | 6/2017 |
| JP | 2017-141531 A | 8/2017 |
| JP | 2017-155364 A | 9/2017 |
| WO | 2000/47628 A2 | 8/2000 |
| WO | 2012/007363 A1 | 1/2012 |
| WO | 2014/087767 A1 | 6/2014 |
| WO | 2014/088072 A1 | 6/2014 |
| WO | 2017/014255 A1 | 1/2017 |
| WO | 2017/179740 A1 | 10/2017 |
| WO | 2018/003492 A1 | 1/2018 |
| WO | 2018/011669 A1 | 1/2018 |

OTHER PUBLICATIONS

Gondo et al. JP 2016-223042, machine translation, Date: Dec. 2016.*
International Search Report and Written Opinion for Application No. PCT/JP2019/013627, dated May 28, 2019, 15 pages.
International Search Report and Written Opinion for Application No. PCT/JP2019/013630, dated May 28, 2019, 15 pages.
International Search Report and Written Opinion for Application No. PCT/JP2019/013635, dated May 28, 2019, 14 pages.
International Search Report and Written Opinion for Application No. PCT/JP2019/013641, dated May 28, 2019, 14 pages.
U.S. Appl. No. 17/043,168, filed Dec. 21, 2020, 2021-0131037, Published.
U.S. Appl. No. 17/043,376, filed Sep. 29, 2020, 2021-0115160, Published.
U.S. Appl. No. 17/042,302, filed Dec. 18, 2020, 2021-0131036, Published.
U.S. Appl. No. 17/043,168, filed Sep. 29, 2020, Pending.
U.S. Appl. No. 17/043,376, filed Sep. 29, 2020, Pending.
U.S. Appl. No. 17/042,302, filed Sep. 28, 2020, Pending.

* cited by examiner

*Primary Examiner* — Mark Halpern
(74) *Attorney, Agent, or Firm* — McCarter & English, LLP; Steven G. Davis; Wei Song

(57) ABSTRACT

Provided is a CM-modified microfibrillated cellulose fiber having a Canada standard freeness of not less than 200 mL and an average fiber diameter of not less than 500 nm. Said fiber enhances paper strength when added to a paper.

13 Claims, No Drawings

CARBOXYMETHYLATED MICROFIBRILLATED CELLULOSE FIBERS AND COMPOSITION THEREOF

CROSS-REFERENCE TO RELATED APPLICATIONS

This application is a U.S. national stage filing, under 35 U.S.C. § 371(c), of International Application No. PCT/JP2019/013641, filed on Mar. 28, 2019, which, in turn, claims priority to Japanese Patent Application No. 2018-070268, filed on Mar. 30, 2018.

TECHNICAL FIELD

The present invention relates to a carboxymethylated microfibrillated cellulose fiber and a composition comprising said fiber.

BACKGROUND ART

During a papermaking process, a composition prepared by dispersing a pulp and a pigment in water is used. The water retention ability of such a composition is important from the viewpoints of increased efficiency of production process and improvement of product quality. For example, when a base paper is made using a pulp slurry as a raw material, the water retention ability of the pulp slurry has a great impact on the water drainage of the slurry on a wire screen and the dispersibility of the pulp, and as a consequence on the paper strength, air resistance and bulkiness of a produced paper. Further, the degree of penetration of a binder into a base paper varies depending on the water retention ability of a pigment coating liquid, and thus, the water retention ability of a pigment coating liquid has a great impact on the strength and adhesiveness of a pigment coated layer and a base paper. In recent years, many studies have been actively conducted on cellulose nanofibers made using cellulose as a raw material. For example, PTL 1 discloses a technique related to a composition comprising a cellulose nanofiber.

CITATION LIST

Patent Literature

PTL 1: Japanese Unexamined Patent Application Publication No. JP 2017-110085

SUMMARY OF INVENTION

Technical Problem

The present inventors conceived an idea that if an attempt is made to enhance the water retention ability of a composition by using a microfibrillated cellulose fiber with a lower degree of defibration than cellulose nanofibers, said fiber is more likely to remain in papers, whereby papers with increased strength can be produced with low cost. However, no study of such an idea has been conducted yet. In light of these circumstances, an object of the present invention is to provide a microfibrillated cellulose fiber that enhances the water retention ability of a composition and exerts an effect to enhance paper strength when added to a paper.

Solution to Problem

The present inventors found that carboxymethylated microfibrillated cellulose fibers with a particular level of freeness can achieve the aforementioned object. Therefore, the aforementioned object is achieved by the following invention.

(1) A carboxymethylated microfibrillated cellulose fiber having a Canada standard freeness of not less than 200 mL and an average fiber diameter of not less than 500 nm.
(2) The carboxymethylated microfibrillated cellulose fiber as set forth in (1), having an electrical conductivity of not more than 500 mS/m, as measured at pH 8 in the form of a 1% by weight solids concentration water dispersion.
(3) The carboxymethylated microfibrillated cellulose fiber as set forth in (1) or (2), having a degree of substitution of from 0.01 to 0.50.
(4) The carboxymethylated microfibrillated cellulose fiber as set forth in any of (1) to (3), having a cellulose type-I crystallinity of not less than 50%.
(5) A composition comprising the carboxymethylated microfibrillated cellulose fiber as set forth in any of (1) to (4) and water.
(6) The composition as set forth in (5), further comprising a raw material pulp.
(7) The composition as set forth in (5) or (6), further comprising a binder.
(8) The composition as set forth in any of (5) to (7), further comprising a white pigment.
(9) A dry solid formed by drying the composition as set forth in any of (5) to (8).
(10) A method of preparing the carboxymethylated microfibrillated cellulose fiber as set forth in any of (1) to (4), the method comprising the steps of:
(A) carboxymethylating a pulp,
(B) wet-grinding the pulp.

Advantageous Effects of Invention

According to the present invention, there can be provided a microfibrillated cellulose fiber that enhances the water retention ability of a composition and exerts an effect to enhance paper strength when added to a paper.

DESCRIPTION OF EMBODIMENTS

The present invention provides a carboxymethylated microfibrillated cellulose fiber having a Canada standard freeness of not less than 200 mL and an average fiber diameter of not less than 500 nm. In this invention, ranges "from X to Y" include both endpoints X and Y.

1. Carboxymethylated Microfibrillated Cellulose Fiber
(1) Carboxymethylated Microfibrillated Cellulose Fiber Microfibrillated cellulose (hereinafter also referred to as "MFC") fibers refer to fibers having an average fiber diameter (also referred to as "average fiber width") of not less than 500 nm, which are obtained by fibrillating a cellulose-based raw material such as pulp. Carboxymethylated microfibrillated cellulose (hereinafter also referred to as "CM-modified MFC") fibers refer to a MFC obtained by fibrillating a carboxymethylated cellulose-based material. In this invention, the average fiber diameter refers to a length-weighted average fiber diameter, which can be determined by an image analysis-based fiber analyzer, such as a fiber tester produced by ABB Japan K.K. or a fractionator produced by Valmet K.K. For example, the MFC is obtained by relatively gently defibrating or beating a cellulose-based raw material using a beater, disperser or the like. Therefore, the MFC has a larger fiber diameter than cellulose nanofibers obtained by intensely defibrating a cellulose-based raw material by a high pressure homogenizer or the like, and has a structure in which the fiber surface is efficiently fluffed (externally fibrillated) while the fiber itself is left not microfiberized (internally fibrillated).

The CM-modified MFC of the present invention is preferably a mechanically-treated, carboxymethylated cellulose fiber (hereinafter also referred to as "mechanically-treated, CM-modified MFC") obtained by chemically modifying (carboxymethylating) a pulp and then subjecting the carboxymethylated pulp to further mechanical treatment such as defibration. In other words, since the CM-modified MFC of this invention is obtained by relatively gently defibrating or beating a carboxymethylated cellulose-based raw material, strong hydrogen bonding present between fibers is weakened by chemical modification. Thus, as compared to a MFC obtained simply by mechanical defibration or beating, the mechanically-treated, CM-modified MFC is characterized in that the fibers are easier to ravel, less damaged, and internally and externally fibrillated in a moderate manner. Further, a water dispersion obtained by dispersing the CM-modified MFC of this invention in water has high hydrophilicity, high water retention ability, and high viscosity.

As mentioned above, the MFC differs in degree of fibrillation from a cellulose-based raw material. It is generally not easy to quantify a degree of fibrillation, but the present inventors found that the degree of fibrillation of a MFC can be quantified based on its Canada standard freeness, water retention value, and transparency.

The CM-modified MFC of the present invention has a carboxymethyl group, which is an anionic group introduced thereto, and thus the physical properties of the CM-modified MFC, including affinity for water, vary depending on the type of carboxymethyl groups, i.e., whether the carboxymethyl groups are of H-type or of salt type. The properties of the CM-modified MFC can vary since the type of carboxymethyl groups is adjusted as appropriate depending on the intended use. Unless otherwise stated, the fiber properties of the CM-modified MFC of this invention are evaluated based on the measurements obtained for a CM-modified MFC which provides an alkaline water dispersion, or more specifically a water dispersion with 1% by weight concentration at pH 8. Since the CM-modified MFC, unlike common pulp, has anionic substituents introduced thereto, said MFC can advantageously be used as an additive such as dispersant or coagulant, taking advantage of its anionic characteristics.

<Canada Standard Freeness>

In order for the aforementioned requirements to be met, the Canada standard freeness of the CM-modified MFC of the present invention is not less than 200 mL, preferably not less than 250 mL. The upper limit of the freeness is not limited but is preferably not more than 900 mL. The Canada standard freeness of the CM-modified MFC of this invention can be adjusted by adjusting the degrees of processing into short fibers, nanosizing and fibrillation during treatment of a CM-modified pulp used as a raw material. In general, Canada standard freeness is used as an index for the freeness (water drainage) of a pulp slurry. The freeness drops with an increase in water retention properties. The present inventors found that when a cellulose fiber has high water retention ability but is highly processed into short fibers, said fiber passes through a net mesh, resulting in an increase in Canada standard freeness. Thus, the inventors had made intensive studies and as a result, found that when a CM-modified pulp is processed into short fibers simultaneously with fibrillation, the pulp shows an increase in Canada standard freeness while having high water retention ability. In other words, a Canada standard freeness of not less than 200 mL is attributable to the fact that a CM-modified pulp is highly processed into short fibers. Since the CM-modified MFC of this invention is highly fibrillated, said MFC itself has high water retention value and can enhance the water retention ability of a composition. Therefore, when the CM-modified MFC of this invention is used, for example, as a papermaking additive, said MFC is more likely to remain in a paper during a papermaking step, leading to efficient enhancement of paper strength.

<Water Retention Value>

The water retention value of the CM-modified MFC of the present invention is preferably not less than 300%, more preferably not less than 350%. When the water retention value is less than 300%, the effect of this invention, which is enhancing the water retention ability of a composition comprising the CM-modified MK of this invention, may not be fully obtained. Water retention value is determined according to JIS P-8228:2018.

<Transparency in the Form of Water Dispersion>

The CM-modified MFC of the present invention is characterized by having low transparency when made into the form of a water dispersion prepared using water as a dispersion medium. In this invention, the transparency refers to the transmittance of light at a wavelength of 660 nm through a 1% (w/v) solids concentration water dispersion of a material of interest (e.g., CM-modified MFC). The specific method of determining transparency is as described below.

A dispersion of the CM-modified MFC (solids concentration: 1% (w/v), dispersing medium: water) is prepared and determined for transmittance of light at 660 nm using the UV-VIS spectrophotometer UV-1800 (produced by Shimadzu Corporation) equipped with rectangular cells with an optical path length of 10 mm.

In the present invention, the transparency of the CM-modified MFC is preferably not more than 40%, more preferably not more than 30%, still more preferably not more than 20%, yet more preferably not more than 10%. In general, the transparency of a cellulose-based material increases when the material is nanosized while it retains its crystallinity. In contrast, the CM-modified MFC of this invention has a low level of transparency because said MFC is not so much highly nanosized and retains its fiber structure. When the CM-modified having a transparency of not more than 40% is internally incorporated into a paper, the CM-modified MFC retains its fiber structure in the paper, thereby reducing the occurrence of a decline in paper thickness or paper density and enabling enhancement of paper strength without deterioration of rigidity.

<Electrical Conductivity>

The electrical conductivity of the CM-modified MFC of the present invention is preferably not more than 500 mS/m, more preferably not more than 300 mS/m, still more preferably not more than 200 mS/m, yet more preferably not more than 100 mS/m, most preferably 70 mS/m, as measured under the condition of pH 8 in the form of a 1.0% by weight water dispersion. The lower limit of the electrical conductivity is preferably not less than 5 mS/m, more preferably not less than 10 mS/m. The electrical conductivity of the CM-modified MFC is higher than that of a CM-modified cellulose-based material used as a raw material. An electrical conductivity exceeding the upper limit means that the concentration of metal and inorganic salts dissolved in a water dispersion of a CM-modified cellulose-based material is above a specified value. When the concentration of metal and inorganic salts is low, electrostatic repulsion can easily occur between fibers, promoting efficient fibrillation.

Hereunder, a method of preparing a CM-modified MFC will be described.

1) Cellulose-Based Raw Material

Examples of cellulose-based raw materials include, but are not particularly limited to, cell close-basest raw materials derived from plants, animals (e.g., sea squirt), algae, microorganisms (e.g., Acetobacter), and microorganism products. Examples of cellulose-based raw materials derived from plants include wood, bamboo, hemp, jute, kenaf, farm waste products, cloth, and pulps (e.g., softwood (nadelholz) unbleached kraft pulp (NUKP), softwood bleached kraft pulp (NBKP), hardwood (laubholz) unbleached kraft pulp (LUKP), hardwood bleached kraft pulp (LBKP), softwood unbleached sulfite pulp (NUSP), softwood bleached sulfite pulp (NBSP), thermomechanical pulp (TMP), softwood dissolving pulp, hardwood dissolving pulp, recycled pulp, waste paper). Also, a cellulose powder obtained by grinding such a cellulose-based raw material as mentioned above may be used. The cellulose raw material used in the present invention can be any or a combination of the aforementioned materials, but is preferably a cellulose fiber derived from a plant or microorganism, more preferably a cellulose fiber derived from a plant, still more preferably a wood-based pulp, most preferably a hardwood pulp.

The average fiber diameter of a cellulose fiber is not particularly limited. Commonly used softwood kraft pulps have an average fiber diameter of about from 30 to 60 µm, and hardwood kraft pulps have an average fiber diameter of about from 10 to 30 µm. Other pulps after a common purification procedure have an average fiber diameter of about 50 µm. For example, in the case of using a raw material obtained through purification of a several centimeter-sized material such as chip, it is preferable to subject the raw material to mechanical treatment by a disintegrator such as refiner or beater to adjust average fiber diameter to not more than about 50 µm, more preferably not more than about 30 µm.

2) Carboxymethylation

Carboxymethylation refers to introducing carboxymethyl groups into a cellulose-based raw material via ether bonds. The carboxymethyl groups may be introduced in the form of a salt (—$CH_2$—COOM, where M is a metal atom). Carboxymethylation is also referred to as etherification. The following provides a detailed description of etherification.

<Cellulose Type-I Crystallinity>

With regard to the cellulose crystallinity of the CM-modified MFC of the present invention, type-I crystals are preferably present at a concentration of not less than 50%, more preferably not less than 60%. By adjusting crystallinity within the aforementioned range, the CM-modified MFC can exhibit different effects, including enhancing paper strength, when added to a paper. Further, when type-I crystals are present at a concentration of not less than 50% in a CM-modified pulp as a raw material, the pulp can be efficiently processed into short fibers and fibrillated by beating or defibrating treatment while it retains its fiber structure, whereby the CM-modified MFC of this invention can be prepared efficiently. Cellulose crystallinity can be controlled by the concentration of a mercerizing agent, the temperature of mercerization treatment, and the degree of carboxymethylation. Since a high concentration of alkali is used for mercerization and carboxymethylation, cellulose type-I crystals are likely to convert to type-II. However, by controlling the degree of modification through, for example, adjusting the amount of an alkali (mercerizing agent) used, desired crystallinity can be maintained. The upper limit of cellulose type-I crystallinity is not particularly limited. In practice, said upper limit is presumed to be about 90%.

The method of determining the cellulose type-I crystallinity of a CM-modified MFC is as described below.

A sample is placed into a glass cell and subjected to measurement using an X-ray diffractometer (LabX XRD-6000, produced by Shimadzu Corporation). The calculation of crystallinity is performed by a method such as Segal—the crystallinity is calculated according to the following equation based on the diffraction strength of plane (002) at $2\theta=22.6°$ and the diffraction strength of amorphous region at $2\theta=18.5°$, with the diffraction strength at $2\theta=10°$ to $30°$ in an X-ray diffraction diagram being used as a baseline.

$$Xc=(I_{002c}-I_a)/I_{002c}\times 100$$

Xc: Cellulose type-I crystallinity (%)

$I_{002c}$: Diffraction strength of plane (002) at $2\theta=22.6°$ $I_a$: Diffraction strength of amorphous region at $2\theta=18.5°$.

CM-modified cellulose can generally be prepared by treating (mercerizing) a cellulose material with alkali and then reacting the resulting mercerized cellulose (also referred to as "alkali cellulose") with a carboxymethylating agent (also referred to as "etherifying agent"). In the thus-obtained CM-modified cellulose, any of the hydroxyl groups located at C2, C4 and C6 position in pyranose rings is carboxymethylated. In general, carboxymethylcellulose (CMC), which is formed by dry-grinding a CM-modified cellulose, is characterized by having water swellability, high safety and the like, and is used as an additive for cosmetics and food products. Therefore, similarly to CMC, the CM-modified MFC of the present invention, which is prepared using a CM-modified cellulose as a raw material, can also be advantageously used as an additive for food products and cosmetics.

The degree of carboxymethyl substitution per anhydrous glucose unit in a CM-modified cellulose or MFC obtained by carboxymethylation is preferably not less than 0.01, more preferably not less than 0.05, still more preferably not less than 0.10. The upper limit of this degree is preferably not more than 0.60, more preferably not more than 0.50, still more preferably not more than 0.4. Therefore, the degree of carboxymethyl substitution is in the range of preferably from 0.01 to 0.50, more preferably from 0.05 to 0.40, still more preferably from 0.10 to 0.30. In general, a CM-modified cellulose has higher affinity for water and higher swellability in water as the degree of carboxymethyl substitution becomes higher and the cellulose type-I crystallinity becomes lower. However, the present inventors found that when a CM-modified pulp obtained by performing a carboxymethylation reaction without deteriorating crystallinity is used as a raw material and the CM-modified pulp is beaten or defibrated in a high water content state, there can be obtained a CM-modified MFC which is fibrillated while retaining its fiber structure.

The method of carboxymethylation is not particularly limited, and examples thereof include such a method as mentioned above, in which a cellulose raw material used as a starting material is subjected to mercerization followed by etherification. For the carboxymethylation reaction, a solvent is generally used. Examples of a solvent include water, alcohols (e.g., lower alcohol) and mixed solvents thereof. Examples of a lower alcohol include methanol, ethanol, N-propyl alcohol, isopropyl alcohol, N-butanol, isobutanol, and tertiary butanol. As for the mixing proportion of a lower alcohol in a mixed solvent, the lower limit is generally not less than 60% by weight, and the upper limit is not more than 95% by weight—thus, said mixing proportion is preferably in the range of from 60 to 95% by weight. The amount of a solvent is generally 3 times by weight that of the cellulose raw material. The upper limit of this amount is not particularly limited, but is preferably 20 times by weight. Therefore, the amount of a solvent is preferably in the range of from 3 to 20 times by weight.

Mercerization is generally performed by mixing a starting material with a mercerizing agent. Examples of a mercerizing agent include alkali metal hydroxides such as sodium hydroxide and potassium hydroxide. The amount of a mercerizing agent used is preferably not less than 0.5 times moles, more preferably not less than 1.0 times mole, still more preferably not less than 1.5 times moles, per anhydrous glucose residues in a starting material. The upper limit of this amount is generally not more than 20 times moles, preferably not more than 10 times moles, more preferably not more than 5 times moles. Therefore, the amount of a mercerizing agent used is in the range of preferably from 0.5 to 20 times moles, more preferably from 1.0 to 10 times moles, still more preferably from 1.5 to 5 times mole.

The reaction temperature for mercerization is generally not less than 0° C., preferably not less than 10° C., and the upper limit of this reaction temperature is generally not more than 70° C., preferably not more than 60° C. Therefore, this reaction temperature is generally in the range of from 0 to 70° C., preferably from 10 to 60° C. The reaction time for mercerization is generally not less than 15 minutes, preferably not less than 30 minutes. The upper limit of this reaction time is generally not more than 8 hours, preferably not more than 7 hours. Therefore, this reaction time is generally in the range of from 15 minutes to 8 hours, preferably from 30 minutes to 7 hours.

The etherification reaction is generally performed by adding a carboxymethylating agent to the reaction system after mercerization. Examples of a carboxymethylating agent include sodium monochloroacetate. The amount of a carboxymethylating agent added is generally preferably not less than 0.05 times moles, more preferably not less than 0.5 times moles, still more preferably not less than 0.8 times moles, per glucose residues in a cellulose raw material. The upper limit of this amount is generally not more than 10.0 times moles, preferably not more than 5 times moles, more preferably not more than 3 times moles. Therefore, this amount is in the range of preferably from 0.05 to 10.0 times moles, more preferably from 0.5 to 5 times moles, still more preferably from 0.8 to 3 times moles. The reaction temperature for etherification is generally not less than 30° C., preferably not less than 40° C., and the upper limit of this reaction temperature is generally not more than 90° C. preferably not more than 80° C. Therefore, this reaction temperature is generally in the range of from 30 to 90° C., preferably from 40 to 80° C. The reaction time for etherification is generally not less than 30 minutes, preferably not less than 1 hour, and the upper limit of this reaction time is generally not more than 10 hours, preferably not more than 4 hours. Therefore, this reaction time is generally in the range of from 30 minutes to 10 hours, preferably from 1 to 4 hours. During the carboxymethylation reaction, a reaction solution may be stirred depending on the need.

The degree of carboxymethyl substitution per glucose unit in a CM-modified cellulose is determined according to, for example, the following method: 1) about 2.0 g (absolute dry) of a CM-modified cellulose is precisely weighted out and placed in a 300 mL stoppered conical flask; 2) 100 mL of a mixed solution of 1000 mL of methanol and 100 mL of premium grade concentrated nitric acid is added, and shaking is continued for 3 hours to convert a carboxymethylcellulose salt (CM-modified cellulose) to a H-type CM-modified cellulose; 3) 1.5-2.0 g of the H-type CM-modified cellulose (absolute dry) is precisely weighted out and placed into a 300 mL stoppered conical flask; 4) the H-type CM-modified cellulose is wetted with 15 mL of 80% methanol, 100 mL of 0.1 N NaOH is added, and shaking is continued at room temperature for 3 hours; 5) excess NaOH is back titrated with 0.1 N $H_2SO_4$ using phenolphthalein as an indicator; 6) the degree of carboxymethyl substitution (DS) is calculated according to the following equation.

$$A=[(100 \times F''-(0.1 \text{ N } H_2SO_4) \text{ (mL)} \times F) \times 0.1]/(\text{absolute dry mass (g) of H-type CM-modified cellulose})$$

$$DS=0.162 \times A/(1-0.058 \times A)$$

A: Amount (mL) of 1 N NaOH required for neutralization of 1 g of H-type CM-modified cellulose
F: Factor for 0.1 N $H_2SO_4$
F': Factor for 0.1 N NaOH 3) Mechanical Treatment At this step, a CM-modified pulp is mechanically defibrated, beaten or disintegrated to an average fiber diameter of not less than 500 nm. Mechanical defibration, beating or disintegration is referred to as "mechanical treatment", and defibrating or beating a CM-modified pulp dispersed in water is referred to as "wet-grinding". Mechanical treatment may be performed once, or may be performed two or more times by repeating the same procedure or combining different procedures. In the case of performing mechanical treatment two or more times, different procedures may be performed at any given timing, and the apparatus to be used may be the same or different. This step can be performed, for example, by any of the following procedures.

the water dispersion of a CM-modified pulp is concentrated to high concentration (not less than 20% by weight) by dehydration or the like, and then subjected to defibration or beating;

the water dispersion of a CM-modified pulp is diluted to reduce concentration (less than 20% by weight, preferably not more than 10% by weight), and then subjected to mechanical treatment such as beating or defibration;

the CM-modified pulp is subjected to drying, followed by mechanical defibration, disintegration or beating;

the CM-modified pulp is subjected to preliminary dry-grinding into short fibers, followed by mechanical defibration, disintegration or beating.

Since the pulp is moderately fibrillated and processed into short fibers in the present invention, it is preferable to perform mechanical treatment twice. To be specific, it is preferred that a CM-modified pulp should be dried and pulverized into short fibers and then a low-concentrated water dispersion of the pulverized CM-modified pulp should be fibrillated by treatment using a refiner or a high-speed disintegrator. The drying of a CM-modified pulp is preferably performed so as to give a water content of not more than 15% by weight, more preferably not more than 10% by weight.

The apparatus used for mechanical treatment is not particularly limited, and examples thereof include different types of apparatus, such as high-speed rotating type, colloid mill type, high pressure type, roll mill type, and ultrasonic type. Specific examples thereof that can be used include some types of apparatus which perform mechanical treatment by causing a metal or blade to act around the axis of rotation on pulp fibers, and other types of apparatus which perform mechanical treatment by means of the friction between pulp fibers, as exemplified by high-pressure or ultrahigh-pressure homogenizer, refiner, beater, PFI mill, kneader, disperser, and high-speed disintegrator.

In the case of defibrating or beating a CM-modified pulp dispersed in water, the lower limit of the solids concentration of the CM-modified pulp in the water dispersion is generally preferably not less than 0.1% by weight, more preferably not less than 0.2% by weight, still more preferably not less than 0.3% by weight. At such a solids concentration, the relative amount of a dispersion medium to the amount of the CM-modified pulp becomes appropriate, leading to greater efficiency. The upper limit of this concentration is generally preferably not more than 50% by weight.

At this step, a CM-modified MFC is obtained. The average fiber diameter of a CM-modified MFC is not less than 500 nm, preferably not less than 1 µm, more preferably not less than 10 µm, in terms of length-weighted average fiber diameter. The upper limit of the average fiber diameter is preferably not more than 60 µm, more preferably not more than 40 µm. The average fiber length of a CM-modified MFC is preferably not less than 50 µm, more preferably not less than 100 µm, still more preferably not less than 200 µm, in terms of length-weighted average fiber length. The upper limit of the average fiber length is preferably not more than 3000 µm, more preferably not more than 1000 µm, still more preferably not more than 500 µm, most preferably not more than 400 µm. When a previously CM-modified pulp is used as a raw material, said pulp is easily fibrillated when subjected to mechanical defibration or beating. In the case of a common pulp, the Canada standard freeness decreases with the progress of beating. However, in the present invention, a raw material pulp is highly processed into short fibers with adjustments being made to the concentration of the raw material to be beaten and the type of an apparatus to be used, whereby there can be obtained a CM-modified MFC having high Canada standard freeness while maintaining high water retention ability.

Length-weighted average fiber diameter and length-weighted average fiber length can be determined using an image analysis-based fiber analyzer, such as a fiber tester produced by ABB Japan K.K. or a fractionator produced by Valmet K.K. The average aspect ratio of a CM-modified MFC is preferably not less than 5, more preferably not less than 10. The upper limit of the average aspect ratio is not particularly limited, and is preferably not more than 1000, more preferably not more than 100, still more preferably not more than 80, most preferably not more than 50. The average aspect ratio can be calculated according to the following equation.

$$\text{Average aspect ratio} = \text{average fiber length/average fiber diameter}$$

It is preferable that the degree of substitution per glucose unit in the CM-modified MFC obtained at this step should be the same as that of a CM-modified pulp used as a raw material.

2. Composition

The composition of the present invention comprises a CM-modified MFC and water. The composition of this invention, which comprises a CM-modified MFC and water as mentioned above, can be used for a wide variety of applications that require water retention. The composition of this invention can be used to serve as, for example, a thickener, a gellant, a shape retainer, an emulsion stabilizer, or a dispersion stabilizer. To be specific, the composition of this invention can be used in papermaking raw materials (additive, raw material pulp), food products, cosmetics, pharmaceuticals, agricultural chemicals, toiletries, sprays, paints, and the like. However, it is preferred that the composition of this invention should be used, in a paper production process, as a paper raw material (pulp slurry) for use at a papermaking step or as a pigment coating liquid or clear coating liquid for use at a coating step. Thus, these applications are described below for instance.

(1) Pulp Slurry

A pulp slurry comprises not only a CM-modified MFC and water, but also a raw material pulp. The raw material pulp refers to a pulp that serves as a main component of a paper. The pulp raw material for a base paper used in the present invention is not particularly limited, and examples thereof that can be used include: mechanical pulps such as ground pulp (GP), thermomechanical pulp (TMP) and chemithermomechanical pulp (CTMP); waste paper pulps such as deinked pulp (DIP) and undeinked pulp; and chemical pulps such as nadelholz (softwood) kraft pulp (NKP) and laubholz (hardwood) kraft pulp (LKP). As waste paper pulps, use can be made of those pulps derived from sorted waste papers such as high-quality paper, medium-quality paper, low-quality paper, newspaper waste paper, leaflet waste paper, magazine waste paper, corrugated paper, and printed waste paper, or those pulps derived from unsorted waste papers comprising a mixture of different waste papers.

The content of a CM-modified MFC in a pulp slurry is preferably $1\times10^{-4}$ to 20% by weight, more preferably $1\times10^{-3}$ to 5% by weight, based on the amount of a raw material pulp. If this content exceeds its upper limit, the water retention ability of the pulp slurry will become too high, possibly causing poor water drainage at a papermaking step. If this content falls below its lower limit, enhancement of water retention ability or enhancement of the paper strength of a paper made with addition of a CM-modified MFC may not be achieved due to too small an amount of a CM-modified MFC added.

The pulp slurry may contain a known filler. Examples of fillers include: inorganic fillers such as heavy calcium carbonate, light calcium carbonate, clay, silica, light calcium carbonate-silica composite, kaolin, fired kaolin, delaminated kaolin, magnesium carbonate, barium carbonate, barium sulfate, aluminum hydroxide, calcium hydroxide, magnesium hydroxide, zinc hydroxide, zinc oxide, titanium oxide, and amorphous silica produced by neutralizing sodium silicate with a mineral acid; and organic fillers such as urea-formalin resin, melamine resin, polystyrene resin and phenol resin. Such fillers may be used alone or in combination. Among them, preferred is heavy calcium carbonate or light calcium carbonate, which are representative fillers used to make neutral and alkaline papers and can give papers high opacity. The content of a filler is in the range of preferably from 5 to 20% by weight based on the amount of a raw material pulp. In the present invention, it is more preferred that the content of a filler should be not less than 10% by weight, since the decline in paper strength can be reduced even when paper ash content is high.

The CM-modified MFC of the present invention can function as a paper strengthening agent or a yield improver in a pulp slurry. In addition to the MFC of this invention, various wet end additives, including bulking agent, dry paper strengthening agent, wet paper strengthening agent, freeness improver, dye, or cationic, nonionic or anionic sizing agent, may be added to a pulp slurry depending on the need.

The pulp slurry of the present invention is prepared by any given method, but it is preferable to add the CM-modified MFC at the step of subjecting a raw material pulp to refining or mixing treatment. When the CM-modified MFC is added at a mixing step, a mixture prepared beforehand by mixing the CM-modified MFC with a filler and other auxiliary agents such as yield improver may be added to a raw material pulp slurry.

The solids concentration of a pulp slurry is adjusted as appropriate depending on papermaking conditions and the like, but is preferably in the range of from 0.1 to 1.0% by weight. Such a pulp slurry is made into a paper by a known papermaking method. Papermaking can be carried out using, for example, but not limited to, a fourdrinier paper machine, a gap former-type paper machine, a hybrid former-type paper machine, an on-top former-type paper machine, or a cylinder paper machine.

(2) Clear Coating Liquid

The clear coating liquid is a coating liquid composed mainly of a water-soluble polymer commonly used as a surface treating agent, including starch (e.g., oxidized starch, modified starch, dextrin), carboxymethylcellulose, polyacrylamide, or polyvinyl alcohol. In addition to the water-soluble polymer, various additives such as water resisting agent, external sizing agent, surface strengthening agent, dye or pigment, fluorescent colorant, and water retainer may be contained in a clear coating liquid. The water-soluble polymer can also serve as a binder.

The content of a CM-modified MFC in a clear coating liquid is not particularly limited. Total solids content may consist of a CM-modified MFC, but from viewpoints of coating suitability and the like, it is preferred to use a CM-modified MFC in admixture with the aforementioned water-soluble polymer. The mixing ratio of water-soluble polymer and CM-modified MFC is in the range of preferably from 1:10000 to 10000:1, more preferably about from about 1:1 to 500:1.

By coating one or both sides of a base paper with a clear coating liquid by a known method, a clear coating layer can be formed. In the present invention, the term "clear coating" refers to coating or impregnating a base paper with a clear coating liquid using a coater such as size press, gate roll coater, premetered size press, curtain coater, or spray coater. The coating amount of a clear coating layer is in the range of preferably from 0.1 to 1.0 $g/m^2$, more preferably from 0.2 to 0.8 $g/m^2$, in terms of solids per one side.

(3) Pigment Coating Liquid

The pigment coating liquid is a composition comprising a white pigment as a main component. Examples of a white pigment include commonly used pigments such as calcium carbonate, kaolin, clay, fired kaolin, amorphous silica, zinc oxide, aluminum oxide, satin white, aluminum silicate, magnesium silicate, magnesium carbonate, titanium oxide, and plastic pigments.

The content of a CM-modified MFC in a pigment coating liquid is preferably in the range of $1\times10^{-3}$ to 1 part by weight based on 100 parts by weight of a white pigment. When this content falls within the aforementioned range, there can be obtained a pigment coating liquid without showing a significant increase in viscosity.

The pigment coating liquid contains a binder. Examples of a binder include, but are not limited to: different types of starches, such as oxidized starch, canonic starch, urea-phosphoric acid esterified starch, etherified starch (e.g., hydroxyethyl etherified starch), and dextrin; different types of proteins, such as casein, soybean protein, and synthetic protein; polyvinyl alcohol; cellulose derivatives such as carboxymethylcellulose and methylcellulose; conjugated diene polymer latexes, such as styrene-butadiene copolymer and methyl methacrylate-butadiene copolymer; acrylic polymer latexes; and vinyl polymer latexes such as ethylene-vinyl acetate copolymer. Such binders may be used alone, or two or more thereof may be used in combination. It is preferable to use a starch-based binder and a styrene-butadiene copolymer in combination.

The pigment coating liquid may contain different auxiliary agents commonly used in the field of paper production, such as dispersant, thickener, antifoamer, colorant, antistatic agent, or antiseptic agent.

By coating one or both sides of a base paper with a pigment coating liquid by a known method, a pigment coating layer can be formed. From the viewpoint of coating suitability, the solids concentration of a pigment coating liquid is preferably in the range of about from 30 to 70% by weight. One, two or three or more pigment coating layers may be formed. When there are two or more pigment coating layers, it is only necessary that any one of the layers should be formed with a pigment coating liquid comprising a CM-modified MFC. The coating amount of a pigment coating layer is adjusted as appropriate depending on the intended use, but in the case of production of a coated paper for printing, said coating amount is not less than 5 $g/m^2$, preferably not less than 10 $g/m^2$, per one side in total. The upper limit of this coating amount is preferably not more than 30 $g/m^2$, more preferably not more than 25 $g/m^2$.

(4) Dry Solid

The composition of the present invention can be dried into a dry solid. In particular, a dry solid (base paper, clear coating layer, pigment coating layer) obtained by drying a water dispersion comprising a raw material pulp, a water-soluble polymer, a white pigment and the CM-modified MFC of this invention has both strength and pliableness. The reason for this is not known but is presumed to be as follows. Since a water dispersion of the CM-modified MFC of this invention is defibrated in a gentler manner than a CNF which is defibrated to the single-nanometer level, the CM-modified MFC of this invention is dispersed in water while it has a fibrillated surface but retains its fiber structure. Therefore, a dry solid obtained by drying such a water dispersion contains a fiber network which is reinforced by hydrogen bonds formed between fibrillated fibers, and thus combines strength and pliableness. Said dry solid can be used as a composition when water is added thereto.

3. Paper Comprising a CM-modified MFC

A paper made from a pulp slurry comprising the CM-modified MFC of the present invention has high paper strength and high air resistance. Also, a paper having a pigment coating layer or clear coating layer formed from a pigment coating liquid or clear coating liquid comprising the inventive CM-modified MFC shows a reduced degree of penetration of a binder into a base paper, and thus has high coating layer strength and high air resistance. Further, a paper made from a pulp slurry comprising the inventive CM-modified MFC is characterized by having high bulkiness.

A paper comprising the CM-modified MFC of the present invention preferably has a base weight of from 10 to 400 $g/m^2$, more preferably from 15 to 100 $g/m^2$. A base paper used to produce a paper comprising the CM-modified MFC of this invention may be composed of a single layer or of multiple layers. A paper made from a pulp slurry comprising the CM-modified MFC has a base paper layer comprising the CM-modified MFC. When the paper has multiple base paper layers, it is only necessary that at least any one of these layers should comprise the CM-modified MFC. Further, the ash content of said paper varies with the presence or absence of a pigment coating layer, but this ash content is preferably in the range of from 0 to 30% for a paper having no pigment coating layer (i.e., base paper or clear coated paper), and in the range of from 10 to 50% for a paper having a pigment coating layer.

A paper comprising the CM-modified MFC may have a clear coating layer depending on the need. Also, a paper comprising the CM-modified MFC may be subjected to surface treatment or other treatments by a known method.

EXAMPLES

Hereunder, the present invention will be described by way of examples. Analysis of physical properties was performed according to the following procedures.

Average fiber length, average fiber diameter: A 0.2% by weight slurry was prepared by adding ion exchange water to a sample and determined for these properties using a fractionator produced by Valmet K.K.

Canada standard freeness (c.s.f): This property was determined according to JIS P 8121-2:2012.

Electrical conductivity: A water dispersion with a sample (e.g., CM-modified MFC) concentration of 1.0% by weight was prepared and determined for electrical conductivity at pH 8 using a portable electrical conductivity meter produced by Horiba Ltd.

Base weight: This property was determined according to JIS P 8223:2006.

Bulk thickness and bulk density: These properties were determined according to JIS P 8223:2006.

Specific burst index: This property was determined according to JIS P 8131:2009.

Specific tensile strength: This property was determined according to JIS P 8223:2006.

Tensile elongation at break and specific tensile energy absorption: These properties were determined according to JIS P 8223:2006 and JIS P 8113:1998.

Short-span specific tensile strength: This property was determined according to JIS P 8156:2012.

Air resistance: This properties was determined according to JIS P 8117:2009 using an Oken air resistance-smoothness tester.

Example A1 Preparation of a CM-modified MFC

A stirrer capable of mixing pulp was charged with 200 g by dry weight of a pulp (NBKP (softwood bleached kraft pulp), produced by Nippon Paper Industries Co., Ltd.) and 111 g by dry weight of sodium hydroxide, and water was added to give a pulp solids content of 20% by weight. Thereafter, the mixture was stirred at 30° C. for 30 minutes, and then 216 g of sodium monochloroacetate (in terms of active component content) was added thereto. The resulting mixture was stirred for 30 minutes, heated to 70° C. and further stirred for 1 hour. Thereafter, the reaction product was taken out, neutralized and washed to obtain a CM-modified pulp of Comparative Production Example 1 having a degree of carboxymethyl substitution per glucose unit of 0.25.

The obtained CM-modified pulp was dispersed in water to form a 4% by weight water dispersion, which was treated in a single-disc refiner (product name: 14 Inch Labo Refiner, produced by Aikawa Iron Works Co., Ltd.) to obtain a CM-modified MFC of Example A1. The physical properties of the CM-modified MFC of Example A1 are shown in Table 1.

Example A2

The CM-modified pulp of Comparative Production Example 1 was dried and pulverized to obtain a CM-modified CMC. The obtained CM-modified CMC was dispersed again in water to form a 4% by weight water dispersion, which was treated in the aforementioned refiner to obtain a CM-modified MFC of Example A2.

Example A3

A CM-modified MFC of Example A3 was obtained by the same procedure as in Example A2, except that the aforementioned refiner was replaced with a high-speed disintegrator (product name: TopFiner, produced by Aikawa Iron Works Co., Ltd.).

Comparative Example A3

A NBKP pulp treated in the aforementioned refiner by the same procedure as in Example A1 was obtained, except for using a non-carboxylated pulp (NBKP, produced by Nippon Paper Industries Co., Ltd.). The physical properties of the treated pulp and the NBKP used as a raw material are shown in Table 1. In this table, the NBKP used as a raw material is denoted as Comparative Example A2.

Example B1

96% by weight of a corrugated waste paper (produced by Nippon Paper Industries Co., Ltd.) and 4% by weight of the CM-modified MFC (483 mL c.s.f.) prepared in Example A1 were mixed to give a mixed pulp with a solids concentration of 0.8% by weight. Based on the total amount of the mixed pulp, 1.0% by weight of aluminum sulfate, 0.15% by weight of polyacrylamide, and 0.2% by weight of a sizing agent were added to prepare a stocks. The prepared pulp slurry was used to make a handmade sheet with an aim to achieve a base weight of 100 g/m², and the handmade sheet was subjected to analysis. The handmade sheet was made according to JIS P 8222.

Examples B2, B3

Handmade sheets were made and analyzed by the same procedure as in Example B1, except for using the CM-modified MFC prepared in Example A2 or A3.

Comparative Examples B1, B2

Handmade sheets were made and analyzed by the same procedure as in Example B1, except that no CM-modified MFC was used. The corrugated waste paper used in Comparative Example B1 was of the same lot as that used in Example B1, and the corrugated waste paper used in Comparative Example B2 was of the same lot as that used in Comparative Example B3.

Comparative Example B3

A handmade sheet was made and analyzed by the same procedure as in Example B1, except that the NBKP prepared in Comparative Example A3 was used instead of a CM-modified MFC. The physical properties of this handmade sheet are shown in Table 2.

TABLE 1

|  |  | Com. Prod. Ex. 1 | Ex. A1 | Ex. A2 | Ex. A3 | Com. Ex. A2 | Com. Ex. A3 |
|---|---|---|---|---|---|---|---|
| Type |  | CM-modified pulp | CM-modified MFC | | | NBKP | Treated NBKP |
| Raw material |  | NBKP | CM-modified pulp (Na) | CMC (Na) (Dried & pulverized CM-modified pulp) | | NBKP | NBKP |
| Average fiber length | mm | 0.77 | 0.36 | 0.29 | 0.34 | 1.72 | 1.76 |
| Average fiber diameter | μm | 15.2 | 13.8 | 14.3 | 15.4 | 16.6 | 16.8 |
| CSF | ml | 52 | 483 | ≥850 | 285 | 620 | 420 |
| Electrical conductivity | mS/m | 28 | 53 | 45 | 42 | 5 | 12 |

TABLE 2

|  |  | Com. Ex. B1 | Ex. B1 | Ex. B2 | Ex. B3 | Com. Ex. B2 | Com. Ex. B3 |
|---|---|---|---|---|---|---|---|
| Raw material | Type | Corrugated waste paper | | | | | |
|  | Amount added % | 100 | 96 | 96 | 96 | 100 | 96 |
| MFC |  | — | Ex. A1 | Ex. A2 | Ex. A3 | — | Com. Ex. A3 |
|  | Amount added % | 0 | 4 | 4 | 4 | 0 | 4 |
| Bulk thickness | mm | 0.161 | 0.151 | 0.155 | 0.154 | 0.163 | 0.159 |
| Bulk density | g/cm$^3$ | 0.63 | 0.67 | 0.65 | 0.66 | 0.62 | 0.64 |
| Specific burst index | kPa · m$^2$/g | 3.27 | 3.59 | 3.66 | 3.78 | 3.11 | 3.26 |
| Specific tensile strength | N · m/g | 39.6 | 48.1 | 48.8 | 49.1 | 39.6 | 41.6 |
| Tensile elongation at break | % | 2.2 | 2.5 | 2.5 | 2.5 | 2.1 | 2.3 |
| Specific tensile energy absorption | J/kg | 629 | 866 | 885 | 897 | 577 | 693 |
| Short-span specific tensile strength | kN · m/kg | 23.9 | 27.3 | 27.0 | 26.6 | 23.7 | 24.2 |
| Air resistance (Oken) | sec | 25 | 80 | 68 | 56 | 25 | 29 |

It is apparent that the paper of the present invention has excellent paper strength and air resistance.

The invention claimed is:

1. A carboxymethylated microfibrillated cellulose fiber having a Canada standard freeness of not less than 200 mL, an average fiber diameter of not less than 500 nm, and an electrical conductivity between 10 and 100 mS/m, as measured at pH 8 in the form of a 1% by weight solids concentration water dispersion.

2. The carboxymethylated microfibrillated cellulose fiber according to claim 1, wherein the electrical conductivity is between 10 and 70 mS/m, as measured at pH 8 in the form of a 1% by weight solids concentration water dispersion.

3. The carboxymethylated microfibrillated cellulose fiber according to claim 2, having a degree of substitution of from 0.01 to 0.50.

4. The carboxymethylated microfibrillated cellulose fiber according to claim 3, having a cellulose type-I crystallinity of not less than 50%.

5. The carboxymethylated microfibrillated cellulose fiber according to claim 1, having a degree of substitution of from 0.01 to 0.50.

6. The carboxymethylated microfibrillated cellulose fiber according to claim 1, having a cellulose type-I crystallinity of not less than 50%.

7. The carboxymethylated microfibrillated cellulose fiber according to claim 1, having a water retention value of not less than 300%.

8. A composition comprising the carboxymethylated microfibrillated cellulose fiber according to claim 1 and water.

9. The composition according to claim 8, further comprising a raw material pulp.

10. The composition according to claim 8, further comprising a binder.

11. The composition according to claim 8, further comprising a white pigment.

12. A dry solid formed by drying the composition according to claim 8.

13. A method of preparing the carboxymethylated microfibrillated cellulose fiber according to claim 1, the method comprising the steps of:
(A) carboxymethylating a pulp,
(B) wet-grinding the pulp.

* * * * *